Aug. 8, 1939.    H. W. KOST    2,169,181
FASTENING DEVICE
Filed July 27, 1938
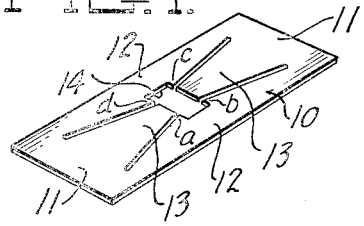
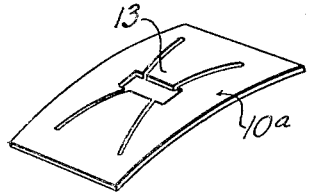
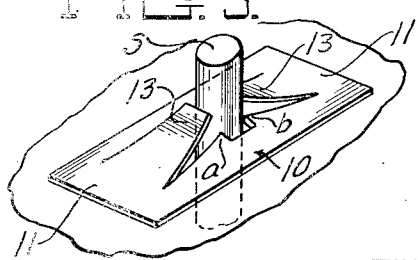
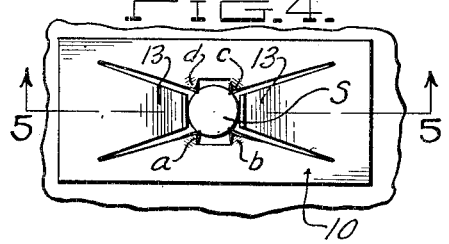
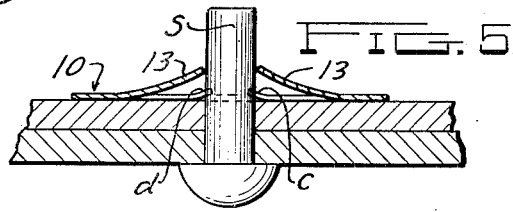
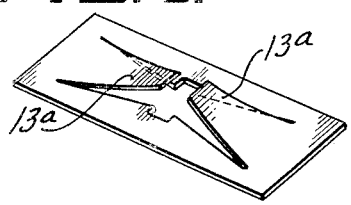
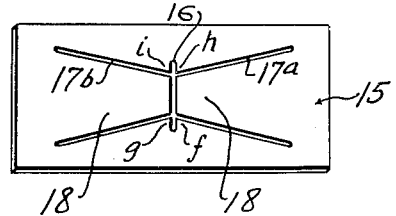
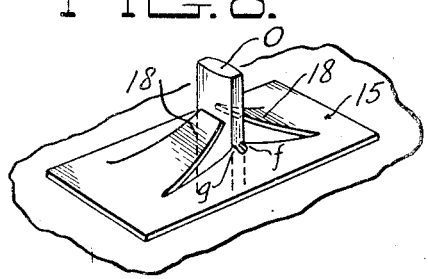
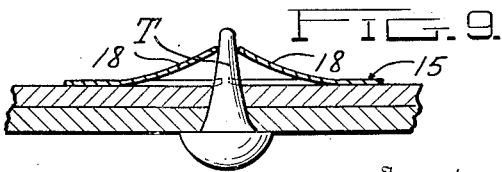
Inventor
Harold W. Kost
By Malcolm W. Fraser
Attorney Patented Aug. 8, 1939

2,169,181

UNITED STATES PATENT OFFICE 2,169,181

FASTENING DEVICE

Harold W. Kost, Ferndale, Mich., assignor, by mesne assignments, to Detroit Harvester Company, Detroit, Mich., a corporation of Michigan Application July 27, 1938, Serial No. 221,506

4 Claims. (Cl. 85—32)

This invention relates to spring fastening devices, such as spring nuts, which enable quick and convenient assembly of parts.

An object is to produce a simple and efficient fastener of the above character having a plurality of gripping elements which engage at different points longitudinally of the stud, thereby to effect a more secure and satisfactory gripping or holding means.

Another object is to provide an extremely simple fastener and method of forming it which is reliable, inexpensive and has the new and improved features of construction and operation hereinafter described.

For purposes of illustration but not of limitation, embodiments of the invention are shown in the accompanying drawing in which Figure 1 is a perspective view of a spring nut fastener in which the body or base is flat;

Figure 2 is a view similar to Figure 1 but showing a cambered fastener;

Figure 3 is a perspective view of the fastener shown in Figure 1 applied to a pin or stud;

Figure 4 is a top plan view of the structure shown in Figure 3;

Figure 5 is a vertical sectional elevation substantially on the line 5—5 of Figure 4;

Figure 6 is a perspective view of a spring nut fastener similar to that shown in Figures 1 to 5 but in which the oppositely disposed tongues are normally inclined with respect to the base or body of the strip;

Figure 7 is a perspective view of an alternate form in which the tongues and teeth are formed by forming slits in the body of the strip;

Figure 8 is a perspective view of the fastener shown in Figure 7 in position of use as applied to a stud substantially oval in cross section; and Figure 9 is a vertical sectional view showing the fastener of Figure 7 applied to a conical pin.

Referring to the drawing, the spring nut shown in Figures 1 and 3 to 5 comprises a substantially rectangular strip 10 of relatively thin spring metal, such as tempered spring steel, having ends 11 which are connected by bridge portions 12. Formed by slitting the metal are oppositely disposed tongues 13, the free ends of which are spaced from each other a relatively short distance. The outer ends of the tongues provide portions of sides of a rectangular opening 14, the walls of which extend a slight distance laterally on opposite sides of the free end of each tongue. This forms four pointed projections, teeth or auxiliary tongues $a$, $b$, $c$ and $d$.

It will be noted that the teeth $b$ and $c$ are disposed on opposite sides of one of the tongues 13 and the teeth $a$ and $d$ are disposed on opposite sides of the other tongue 13. Preferably the construction is such that the distance between the diametrically opposed teeth, such as $a$ and $c$, is less than the diameter of the stud to which the nut is to be applied. Likewise the distance between the teeth $b$ and $d$ is less than the diameter of the stud so that when the nut is applied to the stud, the teeth are displaced or deformed outwardly and owing to the resiliency of the metal, they bite into or grip the stud at four points. Such gripping force is in addition to that exerted by the tongues 13.

As is shown in Figures 3 to 5, the tongues 13 are forced upwardly when the nut is applied to the stud S and, as will be readily understood by those skilled in the art, the tongues 13 bind against the stud and resist relative movement between these parts in the opposite direction. The teeth $a$, $b$, $c$ and $d$ supplement the action of the tongues 13 and, in use, are spaced longitudinally of the stud from the contacting surfaces of the tongues 13, thereby to increase the binding action and provide a more reliable fastener.

If desired, the body of the spring nut may be somewhat cambered as indicated at 10a in Figure 2 thereby somewhat increasing the lever action of the tongues 13. Furthermore, as an alternative form the structure shown in Figure 6 may be employed in which the tongues 13a are initially or normally inclined with respect to the body of the nut, thus facilitating to some extent the application of the nut to the stud or other part to which the nut is to be applied.

In the alternate form shown on Figures 7 to 9 the spring nut is formed from a rectangular strip 15 and in the central region thereof a transverse slit 16 is formed. On opposite sides of the slit 16 and connected thereto at points spaced from opposite ends thereof are pairs of slits 17a and 17b. The slits of each pair extend longitudinally of the strip but are inclined in opposite directions outwardly toward the side edges of the strip and terminate short of the end thereof. It will be obvious that by this extremely simple method, a pair of tongues 18 is formed and also teeth or auxiliary tongues $f$, $g$, $h$ and $i$, similar to the teeth $a$ to $d$ above described.

A nut of this character is not only simple and inexpensive to manufacture but is capable of being applied to studs of different shapes without militating against its ability to hold effectively the parts in assembled relation. For example, as shown in Figure 8, it can be applied to a stud or pin O substantially oval in cross section. Similarly, as shown in Figure 9, a nut of this construction can be applied to advantage to a tapered or conical pin T. The teeth or auxiliary tongues *f* to *i* grip or intimately engage the stud and may or may not be displaced when applied thereto. For its greatest efficiency, a slight displacing of the teeth or auxiliary tongues is desirable.

The above fasteners or spring nuts accomplish the purpose intended in a highly efficient manner and much more securely grip and retain the nut in place than is the case with similar nuts. It will be obvious that these structures can be produced most inexpensively and solve an important problem in automotive and other industries because of the ease, rapidity and convenience in applying.

It is to be understood that numerous changes in construction, arrangement and choice of materials may be effected without departing from the spirit of the invention especially as defined in the appended claims.

What I claim is:

1. A fastening device, including a plate-like body formed of spring material so as to be capable of flexure and having an opening transverse of its longitudinal axis and between its ends to receive an element to be fastened, said body having a pair of opposed tongues the free ends of which define parts of the opening and which are formed to engage opposite sides of the element, the ends of said opening extending outwardly beyond the respective sides of the free end portions of the tongues to form a pair of pointed and spaced teeth at each end of the opening, each of said teeth projecting beyond the parts of the body between the teeth to such extent so that said parts will be free of engagement with the element whereby the teeth only will engage and bite against the element, all of said teeth engaging the element in a plane at right angles to the plane of engagement of the tongues with the element, thereby providing with the tongues a six-point engagement about substantially the perimeter of the element.

2. A fastening device in accordance with claim 1, wherein the opening is substantially rectangular in shape and wherein the tongues are normally inclined with respect to the body and the free ends of which tongues have straight edge portions which act to bite against the element.

3. A fastening device in accordance with claim 1, wherein the opening is in the form of a narrow slit with straight intermediate side portions whereby the free ends of the tongues resultant from the slit have correspondingly straight edge portions that act to bite against the element.

4. A fastening device in accordance with claim 1, wherein the free ends of the tongues have straight edge portions which act to bite against the element.

HAROLD W. KOST.